(12) United States Patent
Davis

(10) Patent No.: US 9,744,417 B2
(45) Date of Patent: *Aug. 29, 2017

(54) HOCKEY-STICK BLADE WITH REINFORCING FRAME

(71) Applicant: EASTON SPORTS, INC., Van Nuys, CA (US)

(72) Inventor: Stephen J. Davis, Van Nuys, CA (US)

(73) Assignee: Bauer Hockey, LLC, Exeter, NH (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/954,799

(22) Filed: Jul. 30, 2013

(65) Prior Publication Data

US 2015/0038272 A1    Feb. 5, 2015

(51) Int. Cl.
| | |
|---|---|
| *A63B 59/14* | (2006.01) |
| *A63B 59/70* | (2015.01) |
| *B29C 44/16* | (2006.01) |
| *B29K 75/00* | (2006.01) |
| *B29K 105/12* | (2006.01) |
| *B29K 63/00* | (2006.01) |
| *B29L 31/52* | (2006.01) |
| *A63B 102/24* | (2015.01) |

(52) U.S. Cl.
CPC ............... *A63B 59/70* (2015.10); *B29C 44/16* (2013.01); *A63B 2102/24* (2015.10); *A63B 2209/00* (2013.01); *B29K 2063/00* (2013.01); *B29K 2075/00* (2013.01); *B29K 2105/12* (2013.01); *B29L 2031/52* (2013.01)

(58) Field of Classification Search
CPC ...... A63B 59/14; A63B 59/70; A63B 2102/24
USPC .................................................. 473/560–563
See application file for complete search history.

(56) References Cited

U.S. PATENT DOCUMENTS

| | | |
|---|---|---|
| 5,407,195 A | 4/1995 | Tiitola |
| 5,607,154 A | 3/1997 | Meumann |
| 5,728,016 A | 3/1998 | Hsu |
| 6,062,996 A | 5/2000 | Quigley et al. |
| 6,918,847 B2 | 7/2005 | Gans |
| 7,008,338 B2 | 3/2006 | Pearson |
| 7,326,136 B2 | 2/2008 | Jean |
| 7,329,195 B2 * | 2/2008 | Pearson ........................ 473/563 |
| 7,789,778 B2 | 9/2010 | Goldsmith |
| 7,914,403 B2 * | 3/2011 | Ie .................................. 473/563 |

(Continued)

FOREIGN PATENT DOCUMENTS

| | | |
|---|---|---|
| EP | 2111970 B1 | 4/2011 |
| WO | 2013036506 A1 | 3/2013 |

OTHER PUBLICATIONS

European Patent Office, Extended European Search Report for EP14178900.8, Jan. 14, 2015.

(Continued)

*Primary Examiner* — Mark Graham
(74) *Attorney, Agent, or Firm* — Banner & Witcoff, Ltd.

(57) ABSTRACT

A hockey-stick blade includes a reinforcing frame that provides improved strength, rigidity, and impact resistance. The reinforcing frame may be continuous along the top, bottom, and toe edges of the hockey-stick blade. The reinforcing frame optionally is a tubular structure made of fiber-reinforced epoxy resin. The interior of the reinforcing frame may include a core made of a resilient material, such as an expandable syntactic foam. Fiber reinforcement may also be included in the frame's construction.

15 Claims, 1 Drawing Sheet

(56) References Cited

U.S. PATENT DOCUMENTS

| | | | |
|---|---|---|---|
| 2003/0004019 A1 | 1/2003 | Lussier | |
| 2005/0181897 A1* | 8/2005 | Chen et al. | 473/563 |
| 2009/0054180 A1* | 2/2009 | Garcia | 473/563 |
| 2011/0237365 A1* | 9/2011 | McGrath et al. | 473/561 |
| 2012/0070301 A1 | 3/2012 | Gans | |
| 2013/0065714 A1 | 3/2013 | Avnery | |
| 2013/0116070 A1* | 5/2013 | Xun et al. | 473/561 |
| 2013/0172135 A1* | 7/2013 | Jeanneau | 473/561 |
| 2014/0148279 A1* | 5/2014 | Villar et al. | 473/563 |
| 2014/0194231 A1* | 7/2014 | Gans | 473/563 |

OTHER PUBLICATIONS

CCM Hockey, "Ultra Tacks Stick Hockey Stick", http://ccmhockey.com/en/product/player/sticks/ultra-tacks-stick, Jan. 2015, 10 pgs.

\* cited by examiner

HOCKEY-STICK BLADE WITH REINFORCING FRAME

BACKGROUND

Hockey sticks generally include a blade and an elongated shaft. Many modern hockey sticks are constructed from lightweight, fiber-reinforced composite materials that provide excellent maneuverability and performance, as well as a sleek appearance. The light weight and resilience of modern hockey sticks enables players to propel pucks at high velocities, which results in high-impact loads to the blade. Further, the hockey-stick blade is subjected to impacts from other stick blades and shafts, arena boards, goal posts, skate blades, and so forth. A high performance hockey-stick blade, therefore, must be able to withstand many loads, including impact loads, bending loads, and torsional loads.

As shown in FIG. 1, existing composite hockey-stick blades 5 are typically formed as a sandwich structure including exterior laminates 7 of fiber-reinforced composite materials and an internal core 9 made of a lightweight material, such as foam. Some designs utilize an internal bridge structure to support the faces of the blade, and some designs incorporate a wear barrier along the edge of the blade. When a sandwich structure is bent or twisted, such as when the blade strikes the ice during a shooting motion, stresses along the edges of the blade laminate promote delamination of the composite plies, which may lead to blade failure.

Thus, it is a challenge to design and construct a hockey-stick blade that is strong, sleek, maneuverable, thin, and durable. It is particularly difficult to mold a traditional sandwich-structure blade with well-consolidated plies around the perimeter of the blade. This is largely due to the effort to avoid fiber-pinch-out, which can occur at the edges of the mold when the mold is closed on the blade preform. Indeed, a blade preform is typically slightly smaller than the mold cavity so that when the mold closes, the edges of the mold do not cut or pinch any fibers. If the preform is too small, however, the mold cavity will not be adequately filled, resulting in either a void or a resin-rich area in the blade, either of which yields a weaker blade.

SUMMARY

A hockey-stick blade includes a reinforcing frame that provides improved strength, rigidity, and impact resistance. The reinforcing frame may be continuous along the top, bottom, and toe edges of the hockey-stick blade. The reinforcing frame optionally is a tubular structure made of fiber-reinforced epoxy resin. The interior of the reinforcing frame may include a core made of a resilient material, such as an expandable syntactic foam. Fiber reinforcement may also be included in the frame's construction. Other features and advantages will appear hereinafter. The features described above can be used separately or together, or in various combinations of one or more of them.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Figure 1:
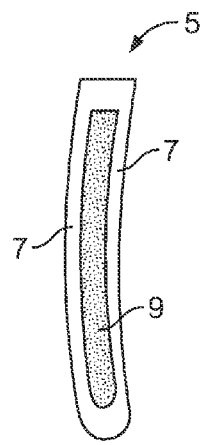
FIG. 1 is a sectional view of a prior-art hockey-stick blade.
Figure 2:
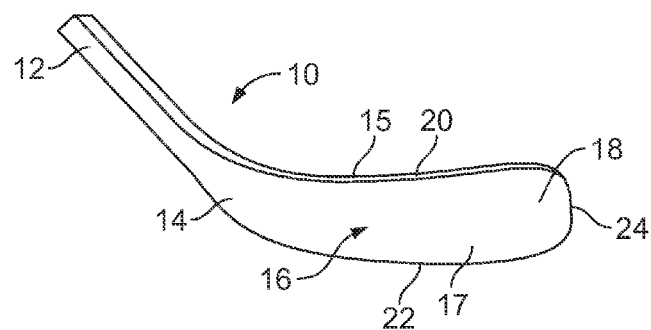
FIG. 2 is a perspective view of a hockey-stick blade.

Turning now in detail to the drawings, as illustrated in FIG. 2, a hockey-stick blade 10 is shown separate from a hockey-stick shaft but it could alternatively be integrated into a one-piece stick. A typical hockey-stick blade has a curvature such that it is intended for use by only one of a left-handed player and a right-handed player.

The blade 10 includes a hosel 12 that is attachable to a shaft. The blade 10 further includes a heel region 14, a striking region 16 (including a forward-facing wall 15 and a rearward-facing wall 17), and a toe region 18, and a top edge 20, a bottom edge 22, and a toe edge 24. These various blade regions may be made of composite laminates or of other suitable materials.

Figure 3:
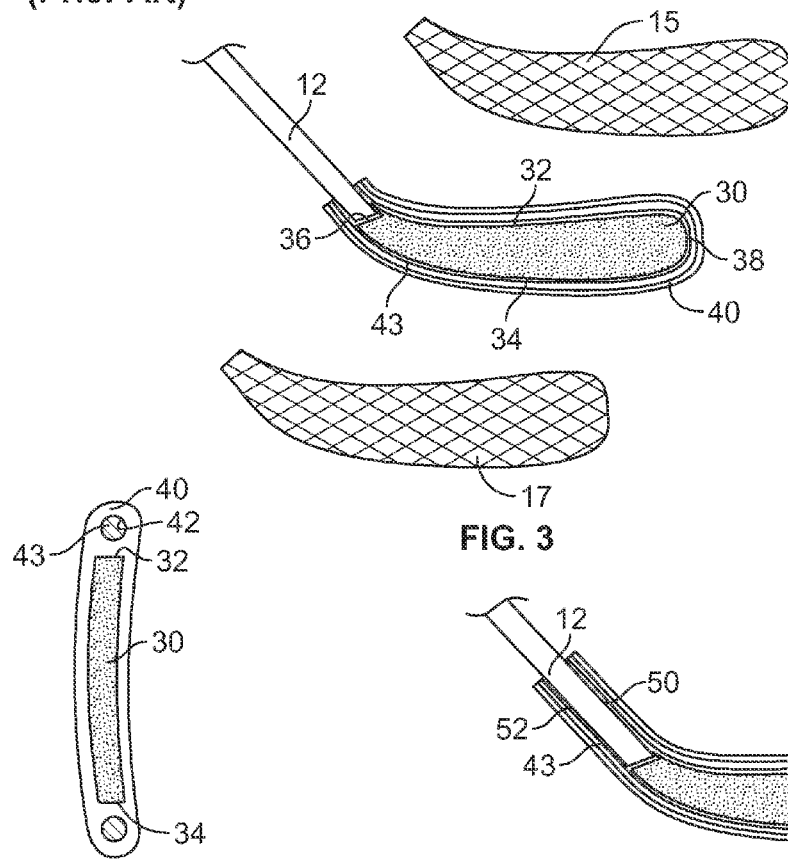
FIG. 3 is an exploded view of a hockey-stick blade including a reinforcing frame, according to one embodiment.
Figure 4:
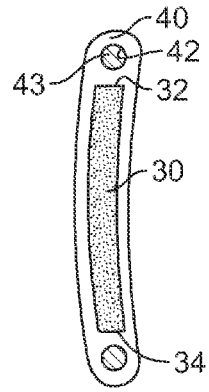
FIG. 4 is a sectional view of the hockey-stick blade shown in FIG. 3.

In the embodiment illustrated in FIGS. 3 and 4, the blade 10 includes one or more internal core elements 30. The core element 30 includes a top edge 32, a bottom edge 34, a heel-end edge 36, and a toe-end edge 38. The core element 30 may be made of a foam material, such as a syntactic foam, a pre-cured polyurethane foam, or a lightweight flexible foam. In one embodiment, the core element 30 is made of a syntactic foam including expandable thermoplastic or glass microspheres embedded in an epoxy-resin matrix. Fiber reinforcement, such as carbon, aramid, or glass fiber, may be added to the matrix to provide additional strength. In an alternative embodiment, the core element 30 may be made of an elastomeric material or of one or more other suitable materials. In another alternative embodiment, the core element may be a bladder or similar structure that provides a hollow space between the front and back faces 15, 17, or the core element may be omitted altogether.

Figure 5:
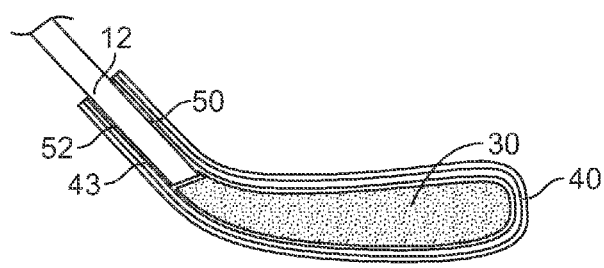
FIG. 5 is an exploded view of a hockey-stick blade including an extended reinforcing frame, according to another embodiment.

In the embodiment illustrated in FIGS. 3 and 4, a reinforcing frame 40 is positioned along the top edge 32, around the toe-end edge 38, and along the bottom edge 34 of the core element 30. In the alternative embodiment illustrated in FIG. 5, the reinforcing frame 40 further extends along an upper surface 50 and a lower surface 52 of the hosel 12. In other embodiments, the reinforcing frame 40 may extend greater or lesser lengths along the top or bottom edges 32, 34 of the core element 30.

In one embodiment, the reinforcing frame 40 may extend around the heel-end edge 36 of the core element, as well, to form a continuous frame around the core element 30. Alternatively, multiple reinforcing frames 40 may be positioned around various regions of the core element 30, and optionally may contact each other at their ends to form a continuous frame 40 around the core element 30. While it is generally preferred that the reinforcing frame 40 cover the toe-end edge 38 of the core element 30 to protect the toe region 18 of the blade 10, in some embodiments the reinforcing frame 40 may run along only the top edge 32, or bottom edge 34, or both, without wrapping around the toe-end region 38. One or more reinforcing frames 40 may alternatively be located in any other desired blade regions.

In the illustrated embodiments, the reinforcing frame 40 is a tubular structure made of a fiber-reinforced resin or of another suitable material. For example, the reinforcing frame 40 may include a laminate made of carbon-fiber-reinforced epoxy resin. Alternatively, glass, aramid, flax, ceramic, thermoplastic, or other suitable fibers may be used to reinforce the resin. Thermoset resins, such as phenolic or vinyl-ester resins, or thermoplastic resins, such as polyamide, polyphenylsulfide, polypropylene, or polyetheretherketone resins, may alternatively be used. In other embodiments, the reinforcing frame may be made of a metal, wood, or other suitable material.

The illustrated reinforcing frame 40 forms the exterior edges of the blade 10. In an alternative embodiment, one or more layers or plies of fiber-reinforced composite material may be wrapped around some or all of the reinforcing frame 40 such that the reinforcing frame 40 does not form the outermost portion of the blade 10. Further, while the illustrated reinforcing frame 40 is tubular in nature, it could take other forms, as well. For example, the reinforcing frame 40 could include squared corners or could have any other suitable cross-sectional shape.

The reinforcing frame 40 may include an opening 42 running throughout some or all of its length. In one embodiment, the opening 42 is filled with a lightweight material, such as a lightweight foam or a syntactic foam 43 including expandable microspheres embedded in an epoxy matrix. The microspheres may be thermoplastic or glass, for example. Fiber reinforcement may be added to the epoxy matrix to provide increased strength. In an alternative embodiment, the opening 42 may be empty such that the reinforcing frame 40 is hollow, or the opening 42 may be omitted such that the reinforcing frame 40 is solid throughout its cross-section.

The reinforcing frame 40 serves as a structural support for the hockey-stick blade 10 that protects the blade 10 against impacts. When shooting a puck, for example, the blade 10 is subjected to bending and torsional loads, since the blade typically contacts the ice or ground before contacting the puck. When a traditional sandwich-structure blade is bent or twisted, stresses along the edges of the blade-laminate promote delamination of the composite plies. The reinforcing frame 40, by increasing the strength, bending stiffness, and torsional stiffness of the blade 10, resists such delamination.

The reinforcing frame 40 also provides a location at which face plies and hosel plies of the hockey-stick blade 10 may be wrapped or attached. The plies forming these blade regions may easily be attached to the reinforcing frame 40. Such a construction may create a box-like structure formed between the front face, back face, top edge, and bottom edge of the blade 10. The face plies may additionally or alternatively be attached to the core element 30.

Additionally, the reinforcing frame 40 facilitates easier, more consistent manufacturing of the hockey-stick blade 10. The quality of the edge regions of the hockey-stick blade 10 is very important to the blade's performance and durability, yet it is often inconsistent due to fiber-pinch-out or inadequate filling of the structural materials in the mold. As described above, the reinforcing frame 40 may be made of one or more composite plies that are wrapped around a syntactic-foam core that includes expandable thermoplastic or glass microspheres. In this configuration, the syntactic foam expands when heated to generate pressure that consolidates the frame's composite plies during molding. When heated, the microspheres may expand, for example, from approximately 20 or 30 microns to approximately 60 microns, or larger. Alternatively, a B-Staged foam including a blowing agent that activates when heated, or any other suitable material that expands when heated, may be used. This expansion creates internal pressure that expands the composite materials of the reinforcing frame 40.

Thus, the pre-molded reinforcing frame 40 may be slightly smaller than the intended outer geometry of the hockey-stick blade 10. The expansion of the syntactic foam increases the size of the reinforcing frame 40 to fill the mold and to consolidate all of the plies. As a result, fiber-pinch-out is greatly reduced or eliminated and a better consolidated laminate near the edges of the blade 10 is achieved.

In one embodiment, the reinforcing frame 40 is formed by rolling preimpregnated composite material around a mandrel, removing the mandrel to yield a hollow preimpregnated tube, and injecting expandable foam inside the tube. The tube may be sealed on each end so the foam does not escape when the tube is formed into a substantially "U" shape to follow the shape of the blade.

In an alternative embodiment, a braided tube of fibers may be used instead of preimpregnated materials. These braids may be made of dry fibers that are subsequently impregnated with resin, or of preimpregnated fiber tows. The fibers may be carbon, glass, aramid, or any other suitable material.

In another embodiment, a rod of B-Staged or semi-cured expanding foam is formed and a roll of preimpregnated material is wrapped around the rod. The rod is then bent into the desired shape and packed into a mold. This may be accomplished by mixing the foam and extruding the rod, then cutting it to length and wrapping the preimpregnated material around it.

The foam may be injected to fill the preimpregnated tube completely and consistently without any trapped air or voids. The injection process is relatively quick and easy. The expanding foam may be a B-Staged foam with a blowing agent that expands when heated, such as a syntactic foam including an epoxy resin with expandable thermoplastic microspheres.

The foam may have a flowable viscosity so that the foam can be put into a syringe or caulking gun and injected into the hollow preimpregnated tube. The expandable foam may be mixed, and the preimpregnated tubes may be rolled, using machinery. The foam may then be injected into the tube using a caulking gun or similar apparatus.

The hollow preimpregnated tube optionally may be frozen to hold its shape and to resist the pressure of injection, or it may be supported on the outside using tape or a fixture. Having a material inside the preimpregnated tube helps to maintain the cross section when the tube is bent into shape. In one embodiment, the preimpregnated tube may be modified to taper or vary in diameter.

The hockey blade is formed by positioning the reinforcing frame 40 in the mold near the edges of the mold, but far enough away from the edges to prevent fiber-pinch-out. The expanding foam material in the frame 40 expands the frame 40 to the edge of the mold, creating a strong perimeter protection. The reinforcing frame forms a "lakebed" or central-blade space that may be filled with a core element 30, such as a lightweight foam, or a different density foam, or no foam at all (in which case a bladder or similar structure could be located in the central-blade space). Additionally, ribs, tubes, or foam-filled tubes may be placed in the central-blade space for added reinforcement. Face plies may be attached to the reinforcing frame 40 or to the core-element materials.

The hosel 12 may be formed by wrapping preimpregnated material around a bladder or expanding silicone rubber material. For example, the hosel 12 may be molded by creating internal air pressure in a bladder, such as an elastomeric bladder, to pressurize fiber-reinforced resin laminates into the shape of the hosel 12. Alternatively, expanding rubber, expanding foam, or a rigid mandrel that is removed after molding may be used to generate internal pressure that consolidates the external composite laminates. The hosel 12 may alternatively be constructed in any other suitable manner. The entire hockey blade may then be co-cured to make an integrated structure.

Any of the above-described embodiments may be used alone or in combination with one another. Further, the hockey-stick blade may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. A hockey-stick blade extending from a heel section to a toe section, comprising:
    a core element including a top edge, a bottom edge, a heel-end edge, and a toe-end edge;
    a hosel extending from the heel section, the hosel defining an upper surface and a lower surface extending parallel to the upper surface;
    a reinforcing frame running along the outside perimeter of the upper surface of the hosel, along a perimeter of the top edge, the toe-end edge, and the bottom edge of the core element to form the exterior edges of the blade, and along the perimeter of the lower surface of the hosel, wherein the reinforcing frame defines an internal continuous opening, such that the internal continuous opening extends around the perimeter of the blade;
    a front-facing wall attached to or integral with at least one of the reinforcing frame and the core element; and
    a rear-facing wall attached to or integral with at least one of the reinforcing frame and the core element.

2. The hockey-stick blade of claim 1 wherein the reinforcing frame comprises a tubular structure.

3. The hockey-stick blade of claim 1 wherein the internal continuous opening is filled with a core material.

4. The hockey-stick blade of claim 3 wherein the core material comprises a syntactic foam including thermoplastic or glass microspheres.

5. The hockey-stick blade of claim 1 wherein the reinforcing frame is hollow.

6. The hockey-stick blade of claim 1 wherein the core element comprises a syntactic foam material.

7. The hockey-stick blade of claim 1 wherein the core element comprises a lightweight foam material.

8. The hockey-stick blade of claim 1 further comprising an external ply overlying the reinforcing frame such that the reinforcing frame is internal to the blade structure.

9. A hockey-stick blade, comprising:
    an elongated member extending longitudinally from a toe section to a heel section, and vertically from a top section to a bottom section, to form a front-facing wall and a generally opposing back-facing wall with a cavity therebetween; and
    a generally tubular reinforcing frame extending in multiple directions to form a portion of the elongated member, the reinforcing frame defining an internal continuous opening, wherein the reinforcing frame forms a perimeter surface of the blade along the top section, toe section, and bottom section of the blade, such that the internal continuous opening extends around the perimeter surface of the blade.

10. The hockey-stick blade of claim 9 wherein the internal continuous opening is filled with a syntactic foam material.

11. The hockey-stick blade of claim 9 wherein the cavity is substantially hollow.

12. The hockey-stick blade of claim 9 wherein the cavity is filled with a foam material.

13. The hockey-stick blade of claim 9, further comprising an external ply overlying the reinforcing frame such that the reinforcing frame is internal to the blade structure.

14. The hockey-stick blade of claim 9 wherein the internal continuous opening defines a circular cross section.

15. The hockey-stick blade of claim 14 wherein the internal continuous opening defines a central axis and the central axis extends parallel at each tangent of a curve defining the perimeter surface.

* * * * *